Wm. H. Lungren's Float Valve and Condenser

No. 116608 A — Patented Jul 4 1871

WITNESSES
George Maxwell
C. M. Smith

INVENTOR
William H. Lungren

116,608

UNITED STATES PATENT OFFICE.

WILLIAM H. LUNGREN, OF BALTIMORE, MARYLAND.

IMPROVEMENT IN HOT-WATER HEATERS.

Specification forming part of Letters Patent No. 116,608, dated July 4, 1871.

*To all whom it may concern:*

Be it known that I, WILLIAM H. LUNGREN, of Baltimore, in the county of Baltimore and State of Maryland, have invented a new and improved mode of getting circulation of water in hot-water heating-pipes and preventing explosions of same, of which the following is a specification:

The nature of my invention consists in providing the upper part of hot-water pipes in heating fixtures with a float-valve so arranged as to allow any steam that may be generated to escape into a receiver provided above, where it may be condensed and return to the pipes; the valve being so arranged as to be lifted by the water should it rise to the bottom, and when lifted to make a joint at top so no water may escape. The receiver above the valve is filled with sponge or other material which will absorb the steam that may escape above valve, and when condensed by remaining in sponge it will return to the pipes, thus preventing any escape or wastage of water, and at the same time preventing air from entering the pipes.

Figure 3:
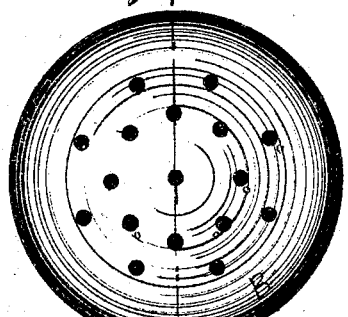
Figure 1:
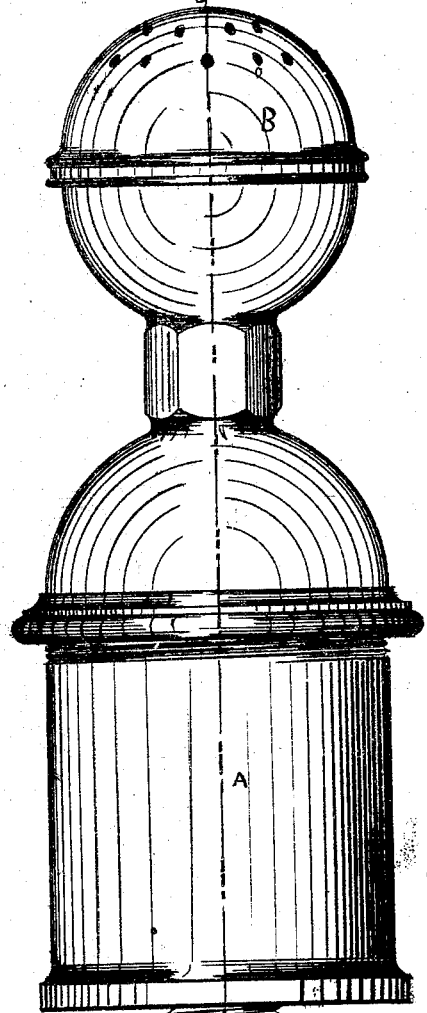
Figure 2:
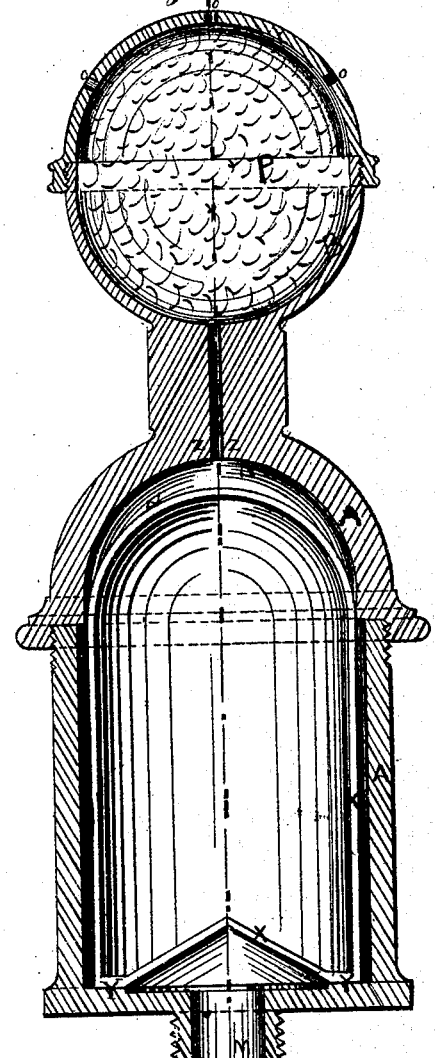
Figure 4:
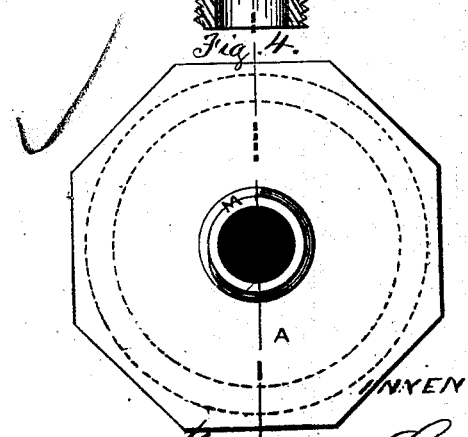

Figure 1, outside elevation; Fig. 2, cross-section of elevation on A B; Fig. 3, top view; Fig. 4, bottom view.

To enable others skilled in the art to make and use my invention, I will describe its construction and operation.

A is the housing or cage to contain valve X, which cage is provided with seat Y on which the valve X rests, and makes a joint when down. The valve X is also provided with smooth curved upper side, which, when raised, will make a joint on housing A. The cage A is provided with connection M, by which it is fastened into the highest point of the hot-water pipes. Above the valve X, connected with the cage A, is a covered cup or receiver, B, connecting with valve-chamber A by small openings Z Z. The receiver B is filled with sponge or other material that will retain moisture. The cap of cage B is perforated to admit cool air to act on the steam-saturated sponge and condense it. The cage and valve with receiver being attached to the hot-water pipes at their highest point, the valve X will remain stationary until steam is generated, when it will rise slightly and allow it to escape into receiver B above, where it will be absorbed by the sponge, and when condensed will run back into the pipes; but should the water rise it will float the valve and raise it until it comes in contact with the upper bearing N, in upper end of cage A, where it makes a joint and prevents any water escaping.

I claim as my invention and desire to secure by Letters Patent—

1. The valve X working in cage A, substantially as and for the purpose hereinbefore set forth.

2. The receiver and condenser B B, substantially as and for the purpose before set forth.

Witnesses:     WILLIAM H. LUNGREN.
    GEORGE MAXWELL,
    W. M. SMITH.